(12) United States Patent
Kashu

(10) Patent No.: US 10,852,254 B2
(45) Date of Patent: Dec. 1, 2020

(54) FOREIGN OBJECT INSPECTION DEVICE AND FOREIGN OBJECT INSPECTION METHOD

(71) Applicant: Sumitomo Chemical Company, Limited, Tokyo (JP)

(72) Inventor: Koji Kashu, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 13 days.

(21) Appl. No.: 16/369,260

(22) Filed: Mar. 29, 2019

(65) Prior Publication Data
US 2019/0302035 A1 Oct. 3, 2019

(30) Foreign Application Priority Data

Mar. 29, 2018 (JP) ................. 2018-065913

(51) Int. Cl.
*G01N 23/04* (2018.01)
*G01T 1/17* (2006.01)
*H01M 10/42* (2006.01)

(52) U.S. Cl.
CPC .............. *G01N 23/04* (2013.01); *G01T 1/17* (2013.01); *H01M 10/4285* (2013.01); *G01N 2223/32* (2013.01); *G01N 2223/413* (2013.01)

(58) Field of Classification Search
None
See application file for complete search history.

(56) References Cited

U.S. PATENT DOCUMENTS

| | | | | |
|---|---|---|---|---|
| 4,759,047 A | * | 7/1988 | Donges | G01V 5/0016 378/57 |
| 2016/0041110 A1 | | 2/2016 | Matoba et al. | |
| 2018/0149602 A1 | * | 5/2018 | Shinomiya | H01M 2/145 |

FOREIGN PATENT DOCUMENTS

| | | |
|---|---|---|
| JP | 2002230522 A | 8/2002 |
| JP | 2003156451 A | 5/2003 |
| JP | 2005265467 A | 9/2005 |
| JP | 2016-38350 A | 3/2016 |

* cited by examiner

*Primary Examiner* — Edwin C Gunberg
(74) *Attorney, Agent, or Firm* — Panitch Schwarze Belisario & Nadel LLP

(57) ABSTRACT

A foreign object inspection device is provided. The device reduces the risk of a failure to detect a foreign object. A direction normal to a principal surface is inclined with respect to a direction in which an intensity of electromagnetic waves emitted from an electromagnetic wave generating source is greatest.

6 Claims, 4 Drawing Sheets

FOREIGN OBJECT INSPECTION DEVICE AND FOREIGN OBJECT INSPECTION METHOD

This Nonprovisional application claims priority under 35 U.S.C. § 119 on Patent Application No. 2018-065913 filed in Japan on Mar. 29, 2018, the entire contents of which are hereby incorporated by reference.

TECHNICAL FIELD

The present invention relates to a foreign object inspection device and a foreign object inspection method.

BACKGROUND ART

Nonaqueous electrolyte secondary batteries such as lithium-ion secondary batteries are in wide use as batteries for personal computers, mobile telephones, portable information terminals, and the like. Lithium-ion secondary batteries, in particular, are drawing attention as batteries that help reduce $CO_2$ emissions and that contribute to energy saving, as compared to conventional secondary batteries.

Separator rolls, which are constituted by a core and a nonaqueous electrolyte secondary battery separator wound around the core, have been under development. In addition, foreign object inspection has been researched for detecting foreign objects adhering to a separator roll.

An example technique applicable to the foreign object inspection is disclosed in Patent Literature 1. Patent Literature 1 discloses a technique in which a time delay integration (TDI) sensor is used to detect a foreign object adhering to a sample, in the following manner. X-rays emitted from an X-ray source are converted into parallel X-rays by a capillary lens, and a sample is irradiated with the parallel X-rays while being moved so as to pass between the X-ray source and the TDI sensor. The TDI sensor receives the parallel X-rays which have propagated through the sample, and a foreign object is detected from an image obtained by the TDI sensor.

CITATION LIST

Patent Literature

[Patent Literature 1]
Japanese Patent Application Publication Tokukai No. 2016-38350 (Publication date: Mar. 22, 2016)

SUMMARY OF INVENTION

Technical Problem

A foreign object adhering to a separator roll is often either sandwiched between an n-th wound layer and an (n+1)th wound layer of the nonaqueous electrolyte secondary battery separator or embedded inside an n-th wound layer. As such, the foreign object is often has a flat shape whose plane is substantially perpendicular to side surfaces of the separator roll. Note here that "n" is a natural number. The "side surface" of a separator roll refers to a surface which is perpendicular to the surface of the nonaqueous electrolyte secondary battery separator which has been wound. If the roll is thought of as a substantially cylindrical body, the "side surface" can be thought of as referring to the top and bottom surfaces of the substantially cylindrical body. In the above-described foreign object inspection, which uses an electromagnetic wave generating source and an image sensor, in order for the image sensor to obtain a clear image of the entirety of the nonaqueous electrolyte secondary battery separator, the electromagnetic wave generating source typically emits electromagnetic waves toward a side surface of the separator roll.

Because of this, in the above foreign object inspection, electromagnetic waves are often emitted toward a side surface of a foreign object. As a result, the resulting image does not show the larger surface of the foreign object with an adequate number of pixels, and thus the image of the foreign object is small. This problematically increases the likelihood of a failure to detect a foreign object.

An object of an aspect of the present invention is to provide a foreign object inspection device and a foreign object inspection method, each of which makes it possible to reduce the risk of a failure to detect a foreign object.

Solution to Problem

In order to attain the above object, an foreign object inspection device in accordance with an embodiment of the present invention includes: an electromagnetic wave generating source configured to emit electromagnetic waves toward an inspection target; and an image sensor having a principal surface on which a plurality of pixels are provided, the plurality of pixels being configured to form an image on a basis of the electromagnetic waves which have propagated through the inspection target, a direction normal to the principal surface being inclined with respect to a direction in which an intensity of the electromagnetic waves emitted from the electromagnetic wave generating source is greatest.

In order to attain the above object, an foreign object inspection method in accordance with an embodiment of the present invention includes the steps of: (a) emitting electromagnetic waves toward an inspection target; and (b) forming an image with use of a plurality of pixels provided on a principal surface of an image sensor, on a basis of the electromagnetic waves which have propagated through the inspection target, the image sensor being provided such that a direction normal to the principal surface is inclined with respect to a direction in which an intensity of the electromagnetic waves emitted toward the inspection target is greatest.

Advantageous Effects of Invention

An aspect of the present invention makes it possible to reduce the risk of a failure to detect a foreign object.

BRIEF DESCRIPTION OF DRAWINGS

FIG. 3 illustrates the principal surface as seen from a direction parallel to the direction in which the intensity of electromagnetic waves emitted from the electromagnetic wave generating source is greatest.

DESCRIPTION OF EMBODIMENTS

Figure 1:
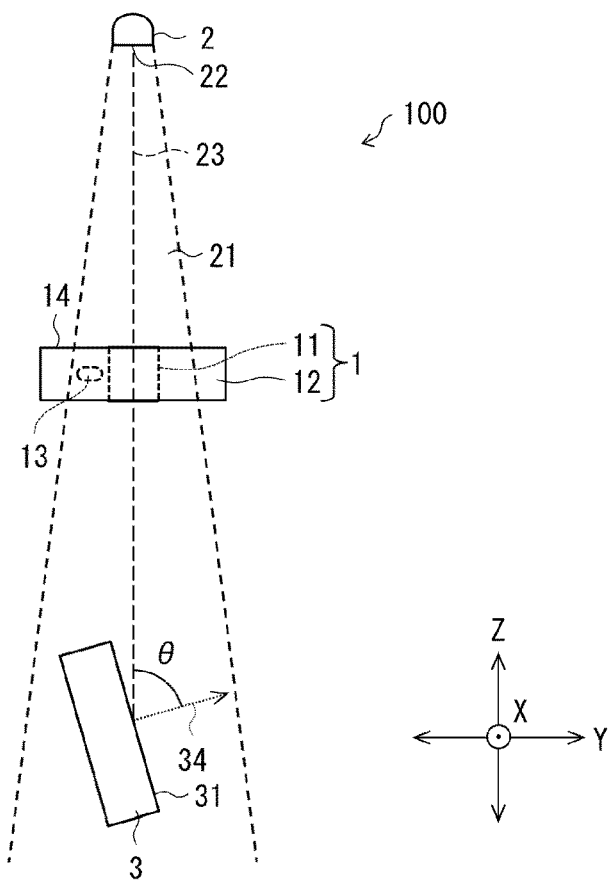
FIG. 1 is a diagram schematically illustrating the configuration of a foreign object inspection device in accordance with an aspect of the present invention.
Figure 2:
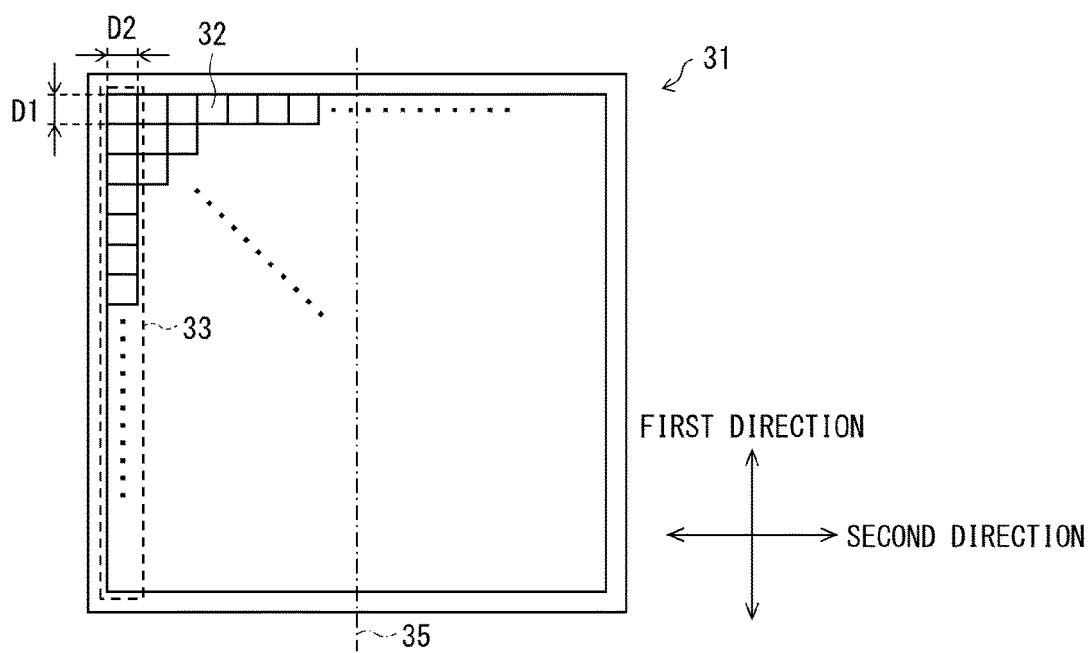
FIG. 2 is a plan view of a principal surface of an image sensor.

FIG. 1 is a diagram schematically illustrating the configuration of a foreign object inspection device 100 in accordance with an aspect of the present invention. FIG. 2 is a plan view of a principal surface 31 of an image sensor 3.

The foreign object inspection device 100 is configured to detect a foreign object 13 adhering to an inspection target 1. The inspection target 1 is a separator roll including a core 11 and a nonaqueous electrolyte secondary battery separator 12. The nonaqueous electrolyte secondary battery separator 12 is a film and is wound around the core 11. The inspection target 1 may alternatively be a roll including a core 11 and a film wound around the core 11 which film is other than a nonaqueous electrolyte secondary battery separator 12, or be something other than a roll including a core 11 and a film wound around the core 11.

The foreign object inspection device 100 includes an electromagnetic wave generating source 2 and an image sensor 3. The electromagnetic wave generating source 2 is configured to emit electromagnetic waves 21 toward a side surface 14 of the inspection target 1. The side surface 14 of the inspection target 1 is a surface which is perpendicular to the surface of nonaqueous electrolyte secondary battery separator 12 which has been wound. The electromagnetic waves 21 propagate through the inspection target 1. Examples of the electromagnetic waves 21 include, but are not limited to, X-rays.

The image sensor 3 has a principal surface 31. The image sensor 3 includes, on the principal surface 31, a plurality of pixels 32 configured to (i) receive electromagnetic waves 21 having propagated through the inspection target 1 and thereby (ii) form an image on the basis of the electromagnetic waves 21. The plurality of pixels 32 are configured so as to form a plurality of inspection stages 33, each of the plurality of inspection stages 33 being formed by multiple pixels 32 arranged along a first direction, the plurality of inspection stages 33 being arranged side by side along a second direction which is perpendicular to the first direction. Each pixel 32 has a dimension D1 along the first direction and a dimension D2 along the second direction.

Note that, in each of the embodiments, three directions (i.e., an X direction, a Y direction, and a Z direction) are defined which are perpendicular to each other. The Z direction is a direction parallel to a direction in which the intensity of the electromagnetic waves 21 emitted from the electromagnetic wave generating source 2 (i.e., the electromagnetic waves 21 emitted toward the inspection target 1) is greatest. In a case where the electromagnetic waves 21 are thought of as a circular cone whose vertex is a center 22 of a part of the electromagnetic wave generating source 2 which part emits the electromagnetic waves 21, the direction in which the intensity of the electromagnetic waves 21 emitted from the electromagnetic wave generating source 2 is greatest can be described as being substantially parallel to a height-wise direction of the circular cone. In FIG. 1, an imaginary straight line along the height of the circular cone is represented as an axis 23. The Y direction is the direction along which the plurality of inspection stages 33 are arranged side by side, as viewed from the Z direction. The X direction is the direction along which the multiple pixels 32 constituting a single one of the inspection stage 33 are arranged, as viewed from the Z direction. When a direction normal to the principal surface 31 matches the Z direction, the first direction and the second direction match the X direction and the Y direction, respectively.

In the foreign object inspection device 100, the direction 34 normal to the principal surface 31 is inclined with respect to the Z direction. An angle θ at which the direction 34 is inclined with respect to the Z direction is not particularly limited provided that it satisfies $-90°<θ<90°$, but preferably satisfies $θ≤-60°$ or $60°≤θ$, and more preferably satisfies $θ≤-85°$ or $85°≤θ$, where 0° represents an angle at which (i) the principal surface 31 is facing the electromagnetic wave generating source 2 and (ii) the direction 34 normal to the principal surface 31 matches the Z direction. Note that $θ≠0°$.

The foreign object inspection device 100 makes it possible for the image sensor 3 to obtain an image which would not be obtained in a configuration where the direction 34 normal to the principal surface 31 is parallel to the Z direction. This makes it possible to provide a new range of applicability to an inspection. Specifically, causing the direction 34 normal to the principal surface 31 to be inclined makes it possible to decrease an apparent area of each pixel 32 provided on the principal surface 31, as viewed from a direction parallel to the Z direction. With this configuration, the number of pixels in the image sensor 3 remains the same while a range of the inspection target 1 which appears in the image formed by the image sensor 3 is decreased. This brings about an effect which is equivalent to increasing the resolution of the image sensor 3. As such, a foreign object 13 appears clearly in the image formed by image sensor 3, and thus it is possible to reduce the risk of a failure to detect a foreign object 13.

Figure 3:
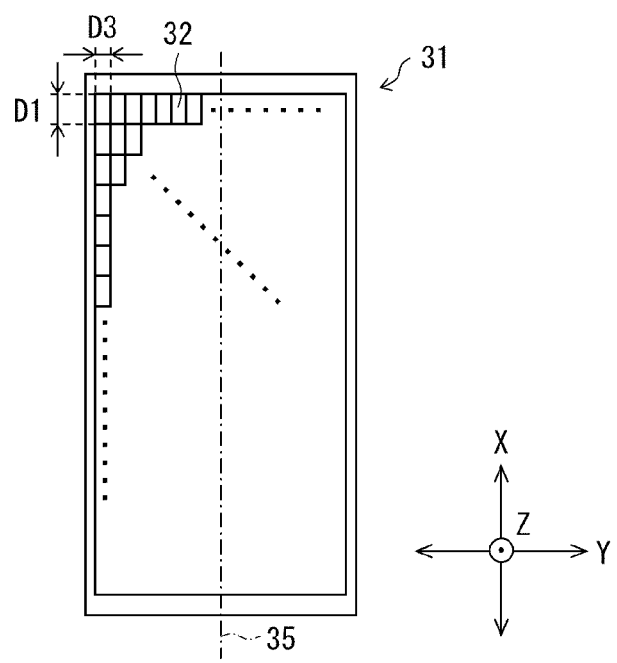
FIG. 3 is a view of the principal surface in a state where a direction normal to the principal surface is inclined with respect to a direction in which the intensity of electromagnetic waves emitted from an electromagnetic wave generating source is greatest.

With reference to FIGS. 1 to 3, the following description will provide a detailed discussion of causing the direction 34 normal to the principal surface 31 to be inclined so as to decrease an apparent area of each pixel 32 provided on the principal surface 31, as viewed from a direction parallel to the Z direction.

FIG. 3 illustrates the principal surface 31 as viewed from a direction parallel to the Z direction, in a state in which the direction 34 normal to the principal surface 31 is inclined with respect to the Z direction.

In FIGS. 1 and 2, the direction 34 normal to the principal surface 31 is inclined in a manner such that, as viewed in a Y-Z planar view, the direction 34 is rotated to the right with respect to the Z direction. As described above, when the direction 34 normal to the principal surface 31 matches the Z direction, the first direction and the second direction match the X direction and the Y direction, respectively. As such, it can be said that the direction 34 normal to the principal surface 31 is inclined with respect to the Z direction in a manner so as to be rotated around an axis 35 which extends in the first direction matching the X direction.

When the direction 34 normal to the principal surface 31 has been rotated in this manner and the principal surface 31 is viewed from a direction parallel to the Z direction, a Y direction-wise apparent dimension D3 of each pixel 32 becomes "dimension $D2*\cos θ$", which is smaller than the dimension D2, as illustrated in FIG. 3. Furthermore, an X direction-wise apparent dimension of each pixel 32 is the dimension D1. In contrast, in a case where the direction 34 normal to the principal surface 31 matches the Z direction and the principal surface 31 is viewed from a direction parallel to the Z direction, the Y direction-wise apparent dimension of each pixel 32 is dimension D2, and the X direction-wise apparent dimension of each pixel 32 is dimension D1. It can therefore be seen that inclining the direction 34 normal to the principal surface 31 causes the apparent area of each pixel 32, as viewed from a direction parallel to the Z direction, to be decreased from (dimension D1*dimension D2) to (dimension D1*dimension D3).

One possible example of the image sensor 3 is a TDI sensor. In a case where the image sensor 3 is a TDI sensor, the foreign object inspection device 100 detects a foreign object 13 adhering to the inspection target 1 as described below.

First, the inspection target 1 is moved in the Y direction, in a manner so as to cause the inspection target 1 to pass between the electromagnetic wave generating source 2 and the image sensor 3, while the electromagnetic waves 21 are emitted toward the inspection target 1. Alternatively, the inspection target 1 is placed between the electromagnetic wave generating source 2 and the image sensor 3 and caused to rotate around an axis perpendicular to the side surface 14, while the electromagnetic waves 21 are emitted toward the inspection target 1. The electromagnetic waves 21 having propagated through the inspection target 1 are received by the plurality of pixels 32 of the image sensor 3. The plurality of pixels 32 form an image on the basis of the electromagnetic waves 21. This image is used to detect a foreign object 13. The plurality of pixels 32 form an image on the basis of an electromagnetic wave 21 at each of a plurality of time points. This allows an image of the same portion of the inspection target 1 to be formed by each inspection stage 33. The plurality of time points, stated differently, indicate a plurality of states of the inspection target 1 being positioned differently. The foreign object inspection device 100 superimposes images of the same portion of the inspection target 1 (which have been formed by the respective inspection stages 33) to produce an image in which a foreign object 13 has been made apparent, and thereby detects the foreign object 13.

In a case where a TDI sensor as the image sensor 3 is used to detect a foreign object 13 on an inspection target 1 in the above manner, a foreign object 13 adhered to the inspection target 1 may appear blurred in the Y direction in an image formed by an inspection stage 33. This tendency is noticeable particularly in a case where the inspection target 1 has a fairly large thickness (i.e., in a case where a Z direction-wise dimension of the inspection target 1 is fairly large).

The foreign object inspection device 100 is configured such that the direction 34 normal to the principal surface 31 is inclined with respect to the Z direction in a manner so as to be rotated around the axis 35. This reduces the Y direction-wise apparent dimension of each pixel 32 as viewed from a direction parallel to the Z direction. This configuration brings about an effect which is equivalent to increasing the resolution of the image sensor 3 in the Y direction. It is therefore possible, in foreign object inspection in which the inspection target 1 is moved in the Y direction, to effectively reduce blurriness of an image obtained by each inspection stage 33. This makes it possible to effectively reduce the risk of a failure to detect a foreign object 13. The above configuration also decreases the total length of the plurality of the inspection stages 33 as measured in the Y direction. The configuration therefore makes it possible, in foreign object inspection in which the inspection target 1 is moved in the Y direction, for all of the inspection stages 33 to obtain respective images of the same portion of the inspection target 1 in a short amount of time. This makes it possible to reduce the risk that blurriness will occur while obtaining images with all of the inspection stages 33, and thus makes it possible to more effectively reduce the risk of a failure to detect a foreign object 13.

The electromagnetic wave generating source 2 emits the electromagnetic waves 21 radially. Emitting the electromagnetic waves 21 in a manner such that the waves spread out has the following advantages. As the position of the principal surface 31 increases in distance from the inspection target 1, the magnification of a resulting image increases. Utilizing this phenomenon to increase the size of the foreign object 13 in the image makes it possible to easily detect the foreign object 13. Note, however, that the electromagnetic wave generating source 2 may emit electromagnetic waves which do not spread out. Examples of electromagnetic waves which do not spread out include parallel electromagnetic waves.

The nonaqueous electrolyte secondary battery separator 12 that is the inspection target 1 can be thought of as a layered body in which a first wound layer, a second wound layer, a third wound layer, etc. are stacked upon each other in a direction perpendicular to the Z direction (i.e., are stacked concentrically upon each other as viewed in an X-Y plane). The direction 34 normal to the principal surface 31 is inclined toward the direction in which layers are stacked in the layered body. This makes it possible to achieve an effect which is equivalent to increasing the resolution of the image sensor 3 along a thickness-wise direction of a foreign object 13 sandwiched between two layers of the nonaqueous electrolyte secondary battery separator 12. As such, in the image formed by image sensor 3, the foreign object 13 is made more visible along the thickness-wise direction of the foreign object 13, and the foreign object 13 can therefore be easily detected.

The following description will discuss a case which is closer to an actual example. Note that the following description assumes an example in which (i) the total number of the plurality of inspection stages 33 in the image sensor 3 is 128, (ii) each of the pixels 32 on the image sensor 3 has a square shape measuring 48 µm per side, and (iii) the center of the image sensor 3 is positioned so as to be passed through by an imaginary line which starts from the center 22 and extends along the direction in which the electromagnetic waves 21 have the greatest intensity.

Assume a case in which the foreign object inspection device 100 is configured such that the angle θ at which the direction 34 normal to the principal surface 31 is inclined with respect to the Z direction is 83°. In such a case, when the principal surface 31 is viewed from a direction parallel to the Z direction, the Y direction-wise apparent total dimension of the plurality of pixels 32, expressed in terms of an equivalent number of inspection stages 33, is 128 stages*cos 83°=15.6 stages. The following statements can be made in such a case.

Given that (i) "StF" represents a distance from the center 22 to a side surface of the inspection target 1 which is further from the electromagnetic wave generating source 2 (this side surface is described later as a "side surface 15"); and (ii) "w" represents a distance between the two side surfaces of the inspection target 1, then in a case where StF=2w and a magnification is 4 times (i.e., the distance from the center 22 to the center of the image sensor 3 is 4 times StF), a resolution in the flow direction (in FIG. 1, the Y direction) is 6 µm to 12 µm when θ=0°, and 0.73 µm to 1.46 µm when θ=83°. Note that "resolution" here refers to how many μm of the inspection target 1 can be observed by each of the pixels 32.

In a case where (i) StF=2w and (ii) w=100 mm, SDD=800 mm (where SDD is a distance from the center 22 to the center of the image sensor 3).

The total length of the 128 inspection stages 33 of the principal surface 31, as measured in the second direction, can be calculated as 128*48=6144 μm.

When θ=83°, a distance from the electromagnetic wave generating source 2 to each of the pixels 32, as measured in the direction of the axis 23 and in a plane formed by the axis 23 and the flow direction, differs between the closest pixel 32 and the farthest pixel 32 by an amount of 6144 μm*sin 83°=approximately 6.1 mm. This creates a difference in the magnification and a difference in the resolution. This difference is determined below. The difference in resolution is less in the second direction than in the first direction. As such, the difference of resolution in the second direction, for which a margin of error is greater, is determined below.

The farthest pixel 32 has a first direction-wise resolution, with respect to a side surface of the inspection target 1 which is farther from the electromagnetic wave generating source 2, which can be calculated as 48*(2*100)/(800+6.1/2) =11.95 μm/1 pixel.

The closest pixel 32 has a first direction-wise resolution, with respect to the side surface of the inspection target 1 which is farther from the electromagnetic wave generating source 2, which can be calculated as 48*(2*100)/(800−6.1/2)=12.05 μm/1 pixel.

The difference between these resolutions is 0.1 μm/1 pixel, and 0.1/12=0.83%, so the difference between these resolutions is sufficiently small.

The farthest pixel 32 has a first direction-wise resolution, with respect to the side surface 14, which can be calculated as 48*100/(800+6.1/2)=5.98 μm/1 pixel.

The closest pixel 32 has a first direction-wise resolution, with respect to the side surface 14, which can be calculated as 48*100/(800-6.1/2)=6.02 μm/1 pixel.

The difference between these resolutions is 0.04 μm/1 pixel, and 0.04/12=0.33%, so the difference between these resolutions is sufficiently small.

Some effects of the foreign object inspection device 100 can be expressed as follows. The foreign object inspection device 100 makes it possible to achieve an effect equivalent to increasing the resolution of the image sensor 3 in the Y direction. This increases the ability of the image sensor 3 to follow the speed of the Y direction-wise movement of the inspection target 1 and also makes it easy to detect a foreign object 13 which is shorter in the Y direction and longer in the X direction. Furthermore, with the foreign object inspection device 100, a Y direction-wise width of a received light beam is reduced, and thus it is possible to reduce blurriness of the foreign object 13.

Figure 4:
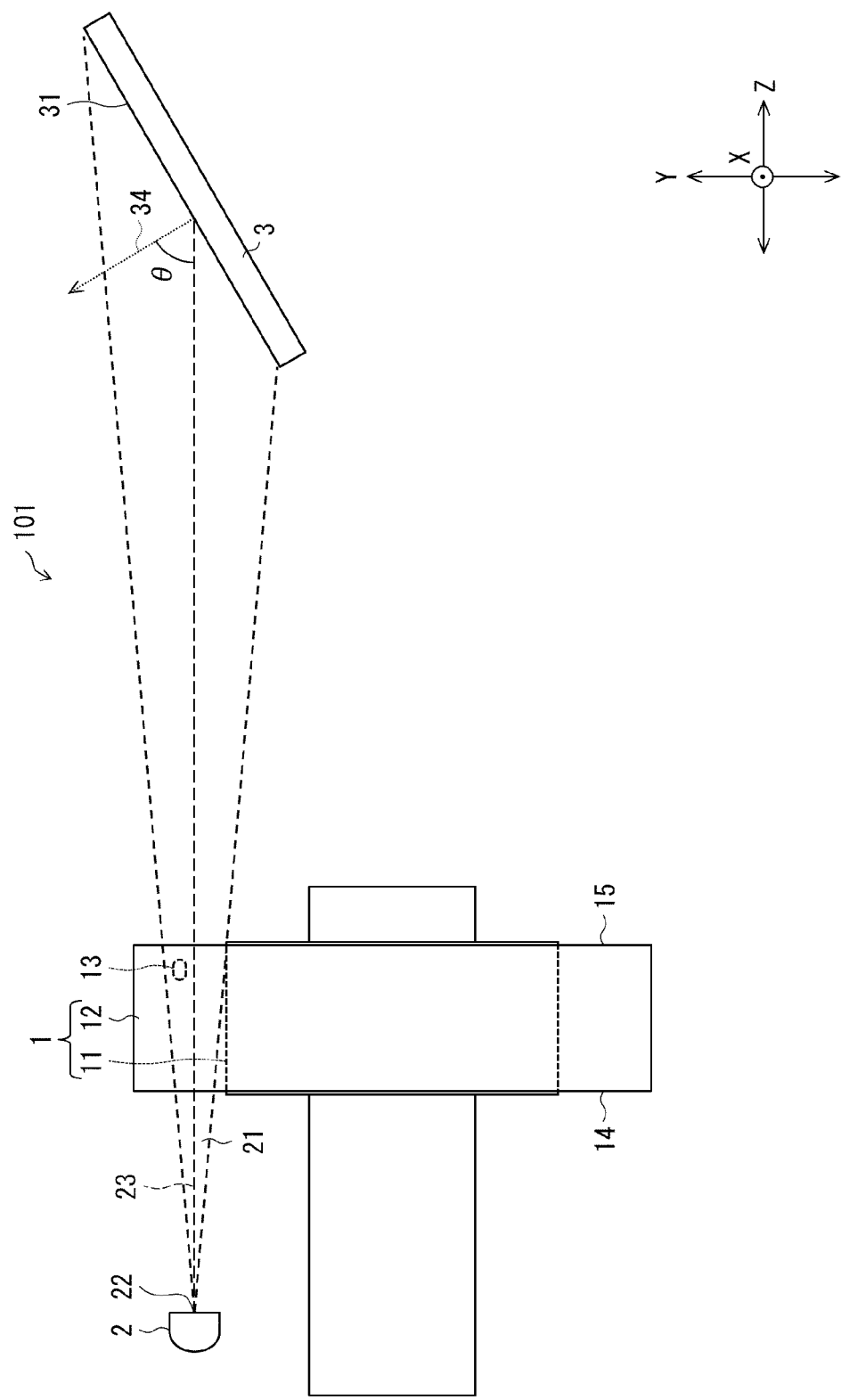
FIG. 4 is a diagram schematically illustrating the configuration of a foreign object inspection device in accordance with another aspect of the present invention.

FIG. 4 is a diagram schematically illustrating the configuration of a foreign object inspection device 101 in accordance with another aspect of the present invention. For convenience of explanation, any component of the foreign object inspection device 101 that is identical in function to a component of the foreign object inspection device 100 is assigned the same reference sign and is not described again. One possible example of an image sensor 3 to be used in the foreign object inspection device 101 is a flat panel detector (FPD) sensor. In a case where the image sensor 3 is an FPD sensor, the foreign object inspection device 101 detects a foreign object 13 adhering to the inspection target 1 as described below.

First, an inspection target 1 is placed between an electromagnetic wave generating source 2 and the image sensor 3 and caused to rotate a certain degree around an axis perpendicular to a side surface 14. Thereafter, electromagnetic waves 21 are emitted toward the inspection target 1. The electromagnetic waves 21 having propagated through the inspection target 1 are received by a plurality of pixels 32 of the image sensor 3. The plurality of pixels 32 form an image on the basis of the electromagnetic waves 21. This image is used to detect a foreign object 13. These steps are repeated so as to produce an image of a certain part of the inspection target 1 and detect a foreign object 13 from the image.

Figure 5:
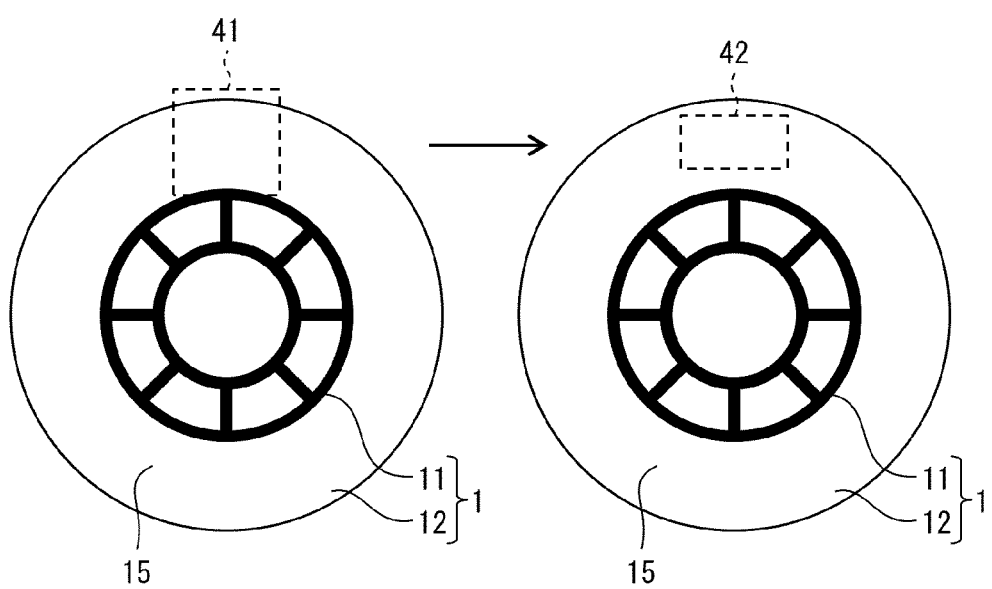
FIG. 5 is a diagram for indicating, with regard to a foreign object inspection device illustrated in FIG. 4, examples of a range of a side surface of an inspection target, specifically a range through which electromagnetic waves that actually reach a plurality of pixels pass.

FIG. 5 is a diagram for indicating, with regard to the foreign object inspection device 101, a examples of a range of a side surface 15, through which range the electromagnetic waves 21 that actually reach the plurality of pixels 32 (illustrated in FIG. 2) pass. Note that the side surface 15 is a side surface, of the inspection target 1, which faces away from the side surface 14. In a case where a direction 34 normal to the principal surface 31 matches the Z direction, this range is, for example, a range 41 as illustrated on the left side of FIG. 5. In a case where the direction 34 normal to the principal surface 31 is inclined with respect to the Z direction, this range is, for example, a range 42 as illustrated on the right side of FIG. 5. From FIG. 5, it can be seen that inclining the direction 34 normal to the principal surface 31 with respect to the Z direction decreases the size of this range, from range 41 to range 42. In other words, the number of pixels of the image sensor 3 remains the same, while the range which appears in the image formed by the image sensor 3 is decreased.

In situations where the foreign object inspection device 101 is used, a foreign object 13 is often present in the inspection target 1 in a state such that a flat surface of the foreign object 13 extends parallel to the Z direction. In a case where the image sensor 3 is an FPD sensor, image capture angles are typically fixed so that the foreign object 13 appears in an image basically in a manner so as to be longer in a direction substantially parallel to the surface of the nonaqueous electrolyte secondary battery separator 12. As such, achieving an effect which is equivalent to increasing the resolution of the image sensor 3 along a direction substantially perpendicular to the surface of the nonaqueous electrolyte secondary battery separator 12 makes it possible to easily detect the foreign object 13.

An effect of the foreign object inspection device 100 can be expressed as follows. The foreign object inspection device 100 achieves an effect which is equivalent to increasing the resolution of the image sensor 3 along a direction substantially perpendicular to the surface of the nonaqueous electrolyte secondary battery separator 12. This makes it easy to detect a foreign object 13 which is (i) thin along a direction substantially perpendicular to the surface of the nonaqueous electrolyte secondary battery separator 12 and (ii) long along a direction substantially parallel to the surface of the nonaqueous electrolyte secondary battery separator 12. As a result, it is easy to detect a foreign object 13 which is elongate, while decreasing the area to be imaged to a lesser degree than would be done in simple enlargement.

Another aspect of the present invention is a foreign object inspection method corresponding to any one of the foreign object inspection devices 100 and 101. In other words, the foreign object inspection method includes the steps of: (a) emitting electromagnetic waves 21 toward the inspection target 1; and (b) forming an image with use of the plurality of pixels 32 provided on the principal surface 31 of the image sensor 3, on a basis of the electromagnetic waves 21 which have propagated through the inspection target 1, the image sensor 3 being provided such that the direction 34 normal to the principal surface 31 is inclined with respect to a direction in which an intensity of the electromagnetic waves 21 emitted toward the inspection target 1 is greatest.

[Recapitulation]

A foreign object inspection device in accordance with an embodiment of the present invention includes: an electromagnetic wave generating source configured to emit electromagnetic waves toward an inspection target; and an image sensor having a principal surface on which a plurality of pixels are provided, the plurality of pixels being configured to form an image on a basis of the electromagnetic waves which have propagated through the inspection target, a direction normal to the principal surface being inclined with respect to a direction in which an intensity of the electromagnetic waves emitted from the electromagnetic wave generating source is greatest.

A foreign object inspection method in accordance with an embodiment of the present invention includes the steps of: (a) emitting electromagnetic waves toward an inspection target; and (b) forming an image with use of a plurality of pixels provided on a principal surface of an image sensor, on a basis of the electromagnetic waves which have propagated through the inspection target, the image sensor being provided such that a direction normal to the principal surface is inclined with respect to a direction in which an intensity of the electromagnetic waves emitted toward the inspection target is greatest.

The above configurations make it possible for the image sensor to obtain an image which would not be obtained in a configuration where the direction normal to the principal surface is parallel to the direction in which the intensity of electromagnetic waves emitted by the electromagnetic wave generating source is greatest. This makes it possible to provide a new range of applicability to an inspection. Specifically, causing the direction normal to the principal surface to be inclined makes it possible to decrease an apparent area of each pixel provided on the principal surface, as viewed from a direction parallel to the direction in which the intensity of the electromagnetic waves emitted by the electromagnetic wave generating source is greatest. With this configuration, the number of pixels in the image sensor remains the same while the range of the inspection target which appears in the image formed by the image sensor is decreased. This brings about an effect which is equivalent to increasing the resolution of the image sensor. As such, a foreign object appears clearly in the image formed by image sensor, and thus it is possible to reduce the risk of a failure to detect a foreign object.

A foreign object inspection device in accordance with an embodiment of the present invention is configured such that: the plurality of pixels are configured so as to form a plurality of inspection stages, each of the plurality of inspection stages being formed by multiple pixels arranged along a first direction, the plurality of inspection stages being arranged side by side along a second direction which is perpendicular to the first direction; and the direction normal to the principal surface is inclined in a manner so as to be rotated around an axis which extends in the first direction.

A foreign object inspection method in accordance with an embodiment of the present invention is arranged such that: the plurality of pixels are configured so as to form a plurality of inspection stages, each of the plurality of inspection stages being formed by multiple pixels arranged along a first direction, the plurality of inspection stages being arranged side by side along a second direction which is perpendicular to the first direction; and the image sensor is provided such that the direction normal to the principal surface is inclined in a manner so as to be rotated around an axis which extends in the first direction.

Here, a "Z direction" is defined as a direction parallel to the direction in which the intensity of the electromagnetic waves emitted from the electromagnetic wave generating source is greatest. A "Y direction" is defined as a direction along which the plurality of inspection stages are arranged side by side, as viewed from the Z direction. More specific definitions of the Z direction and the Y direction are provided above along with a specific definition of an X direction. The above configurations bring about an effect which is equivalent to increasing the resolution of the image sensor in the Y direction. It is therefore possible, in foreign object inspection in which the inspection target is moved in the Y direction, to effectively reduce blurriness of an image obtained by each inspection stage. This makes it possible to effectively reduce the risk of a failure to detect a foreign object.

The above configurations also make it possible to decrease the total length of the plurality of the inspection stages as measured in the Y direction. The above configurations therefore make it possible, in foreign object inspection in which the inspection target is moved in the Y direction, for all of the inspection stages to obtain respective images of the same portion of the inspection target in a short amount of time. This makes it possible to reduce the risk that blurriness will occur while obtaining images with all of the inspection stages, and thus makes it possible to more effectively reduce the risk of a failure to detect a foreign object.

A foreign object inspection device in accordance with an embodiment of the present invention is configured such that the electromagnetic wave generating source emits the electromagnetic waves in a manner such that the electromagnetic waves spread out.

A foreign object inspection method in accordance with an embodiment of the present invention is arranged such that the electromagnetic waves are emitted in a manner so as to spread out.

With the above configurations, as the position of the principal surface of the image sensor increases in distance from the inspection target, the magnification of a resulting image increases. Utilizing this phenomenon to increase the size of the foreign object in the image makes it possible to easily detect the foreign object.

A foreign object inspection device in accordance with an embodiment of the present invention is configured such that: the inspection target includes a layered body in which layers of film are stacked in a direction perpendicular to the direction in which the intensity of the electromagnetic waves emitted from the electromagnetic wave generating source is greatest; and the direction normal to the principal surface is inclined toward the direction in which the layers are stacked in the layered body.

A foreign object inspection method in accordance with an embodiment of the present invention is arranged such that: the inspection target includes a layered body in which layers of film are stacked in a direction perpendicular to the direction in which the intensity of the electromagnetic waves emitted toward the inspection target is greatest; and the image sensor is provided such that the direction normal to the principal surface is inclined toward the direction in which the layers are stacked in the layered body.

The above configurations bring about an effect which is equivalent to increasing the resolution of the image sensor in the thickness-wise direction of a foreign object sandwiched between two layers of film. As such, in the image formed by image sensor, the foreign object is made more visible along the thickness-wise direction of the foreign object, and the foreign object can therefore be easily detected.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Inspection target
12 Nonaqueous electrolyte secondary battery separator
13 Foreign object
2 Electromagnetic wave generating source
21 Electromagnetic wave
3 Image sensor
31 Principal surface
32 Pixel
33 Inspection stage
34 Direction normal to principal surface
35 Axis extending in first direction
100, 101 Foreign object inspection device
Z Direction parallel to direction in which intensity of electromagnetic waves emitted from electromagnetic wave generating source is greatest

The invention claimed is:

1. A foreign object inspection device comprising:
an electromagnetic wave generating source configured to emit electromagnetic waves toward an inspection target; and
an image sensor having a principal surface on which a plurality of pixels are provided, the plurality of pixels being configured to form an image on a basis of the electromagnetic waves which have propagated through the inspection target,
wherein a direction normal to the principal surface being inclined with respect to a direction in which an intensity of the electromagnetic waves emitted from the electromagnetic wave generating source is greatest,
wherein the inspection target includes a layered body in which layers of film are stacked in a direction perpendicular to the direction in which the intensity of the electromagnetic waves emitted from the electromagnetic wave generating source is greatest, and
wherein the direction normal to the principal surface is inclined toward the direction in which the layers are stacked in the layered body.

2. The foreign object inspection device according to claim 1, wherein:
the plurality of pixels are configured so as to form a plurality of inspection stages, each of the plurality of inspection stages being formed by multiple pixels arranged along a first direction, the plurality of inspection stages being arranged side by side along a second direction which is perpendicular to the first direction; and
the direction normal to the principal surface is inclined as a result of rotation of the image sensor around an axis which extends in the first direction.

3. The foreign object inspection device according to claim 1, wherein the electromagnetic wave generating source emits the electromagnetic waves in a manner such that the electromagnetic waves spread out.

4. A foreign object inspection method comprising the steps of:
(a) emitting electromagnetic waves toward an inspection target; and
(b) forming an image with use of a plurality of pixels provided on a principal surface of an image sensor, on a basis of the electromagnetic waves which have propagated through the inspection target,
the image sensor being provided such that a direction normal to the principal surface is inclined with respect to a direction in which an intensity of the electromagnetic waves emitted toward the inspection target is greatest,
wherein the inspection target includes a layered body in which layers of film are stacked in a direction perpendicular to the direction in which the intensity of the electromagnetic waves emitted toward the inspection target is greatest; and
wherein the image sensor is provided such that the direction normal to the principal surface is inclined toward the direction in which the layers are stacked in the layered body.

5. The method according to claim 4, wherein:
the plurality of pixels are configured so as to form a plurality of inspection stages, each of the plurality of inspection stages being formed by multiple pixels arranged along a first direction, the plurality of inspection stages being arranged side by side along a second direction which is perpendicular to the first direction; and
the image sensor is provided such that the direction normal to the principal surface is inclined in a manner as a result of rotation of the image sensor around an axis which extends in the first direction.

6. The method according to claim 4, wherein the electromagnetic waves are emitted in a manner so as to spread out.

* * * * *